INVENTOR
BERTRAND F. KENYON
BY Liverance and Van Antwerp
ATTORNEYS

May 22, 1951 B. F. KENYON 2,554,334
TRANSMISSION
Filed June 16, 1947 3 Sheets-Sheet 2

INVENTOR
BERTRAND F. KENYON
By Liverance and
Van Antwerp
ATTORNEYS

May 22, 1951 B. F. KENYON 2,554,334
TRANSMISSION
Filed June 16, 1947 3 Sheets-Sheet 3

INVENTOR
BERTRAND F. KENYON
BY Liverance and
Van Antwerp
ATTORNEYS

Patented May 22, 1951

2,554,334

UNITED STATES PATENT OFFICE 2,554,334

TRANSMISSION

Bertrand F. Kenyon, Grand Rapids, Mich., assignor to Albert G. Dickinson, Grand Rapids, Mich.

Application June 16, 1947, Serial No. 754,932

10 Claims. (Cl. 74—751)

The present invention is concerned with a controllable, variable, direct transmission drive with a reciprocating centrifugal force control directed to the driving of a driven shaft from a driving shaft, by means of a centrifugal force drive, eliminating all cams, eccentrics, crank shafts and frictional surfaces. Previously there have been driving mechanisms to connect driving and driven shafts or members through frictional surfaces or by hydraulic means. But in the present invention the driving shaft or member balances the power to the load by the control of a torque arm, which varies the amount of the centrifugal force supplied to the driven member by the control of the length of stroke of such torque arm, and the driven means is balanced to the driving means through the application of only so much of the centrifugal force to the load as may be desired. There are no mechanical brakes and the drive runs continuously in any selected ratio without generating heat and without loss of torque, and is capable of being made non-stallable through regulation of the force to serve or meet the torque output.

In furtherance of the functions and objects stated, both the torque arm and the centrifugal weight always revolve at the same speed as that of the driving shaft. The mechanism is completely under the control of the operator. It may be used in many relations, and when used in automotive installations, as an example, it automatically meets all requirements for all gear ratios, not being restricted to a limited number of such ratios, but increasing progressively from the lowest to the highest, or oppositely, from the highest to the lowest.

Further with my invention, a particularly practical, sturdy and durable, yet simple and economically produced mechanism for the purpose outlined is produced, one readily manufactured and assembled, and of exceptionally long life and dependability.

An understanding of the invention attaining the results and objects stated may be had from the following description taken in connection with the accompanying drawings, in which.

Figure 1:
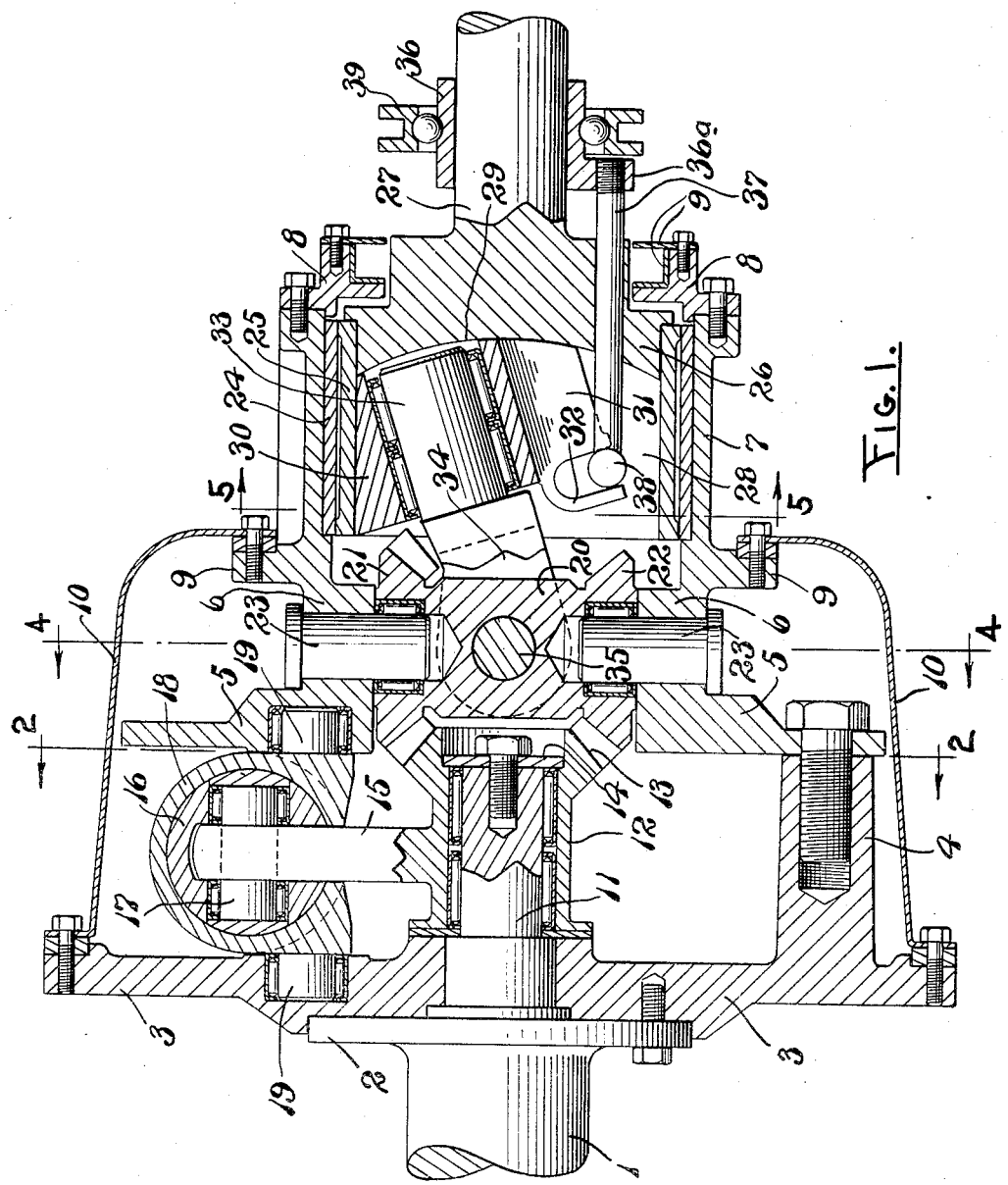
Fig. 1 is a central vertical section through a preferred form of transmission embodying my invention, located between a driving and a driven shaft.
Figure 4:
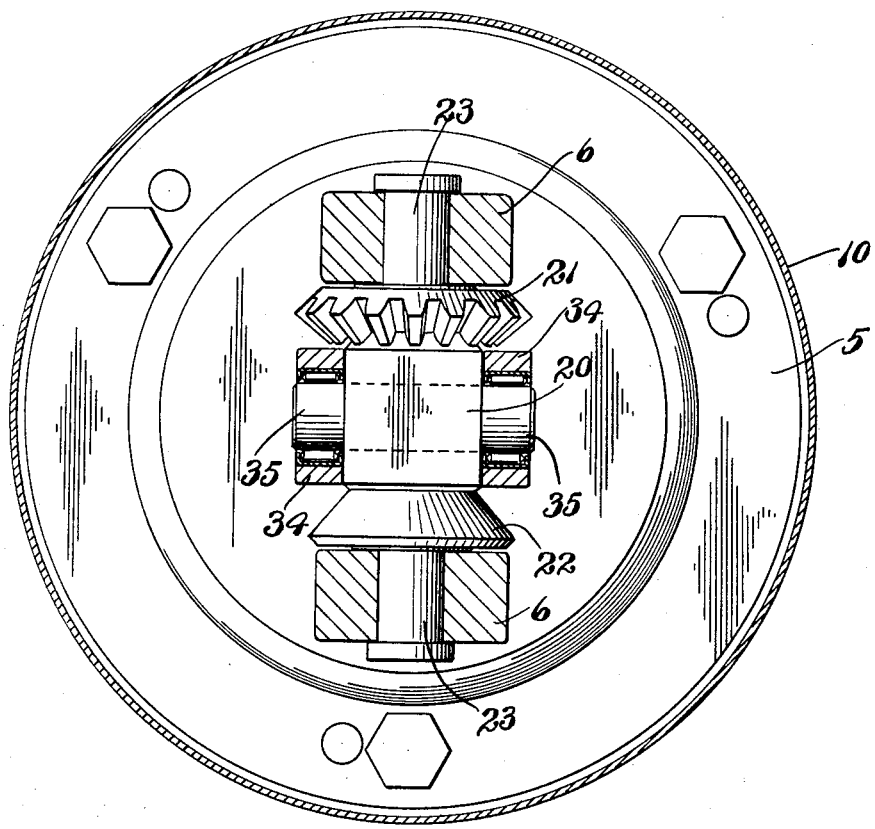
Figure 5:
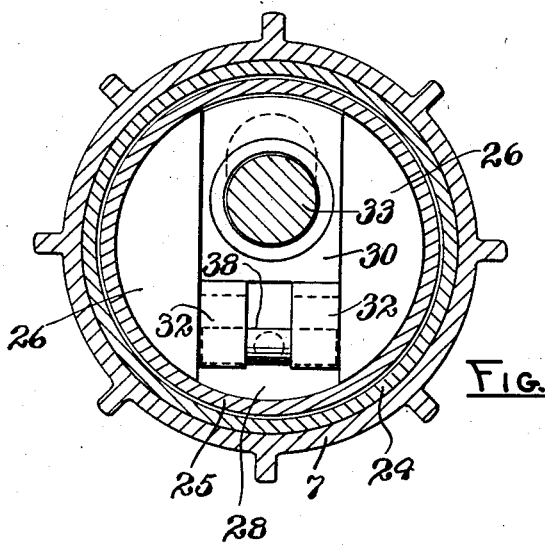

Figs. 4 and 5 are transverse vertical sections substantially on the planes of lines 4—4 and 5—5 of Fig. 1 looking in the direction indicated by arrows.

Like reference characters refer to like parts in the different figures of the drawings.

Figure 2:
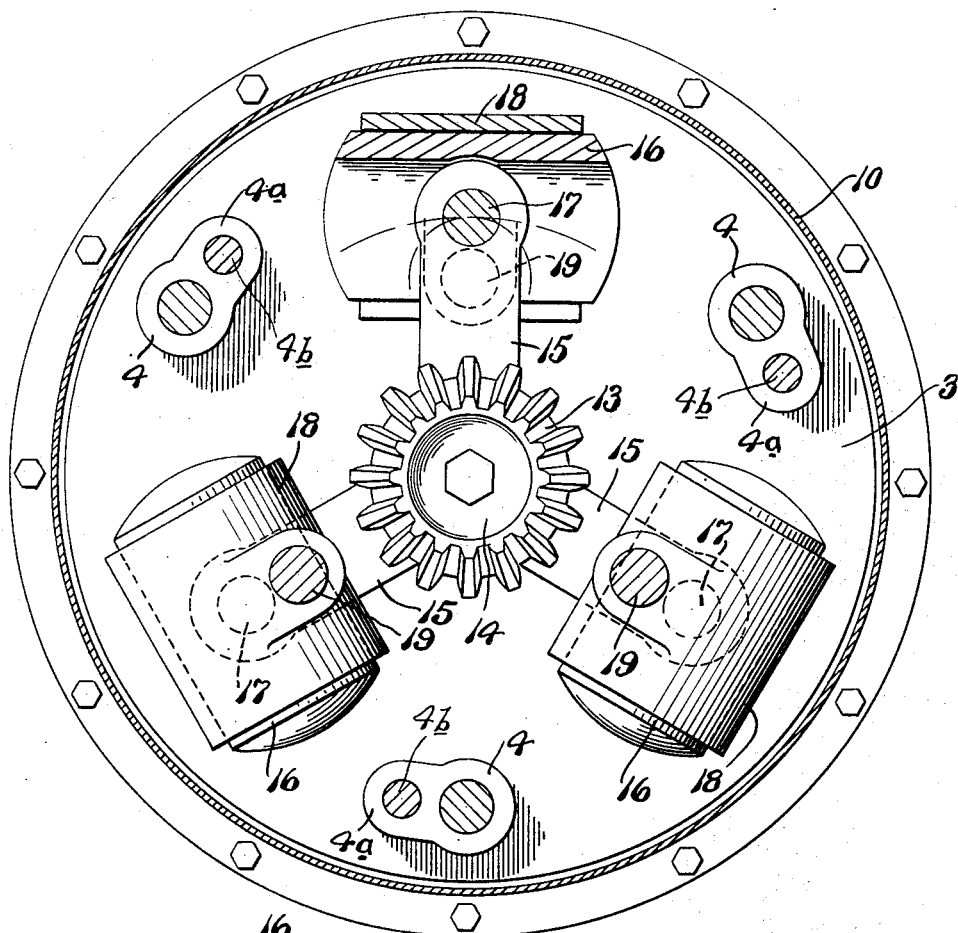
Fig. 2 is a vertical transverse section substantially on the plane of line 2—2 of Fig. 1, looking in the direction indicated.

In the construction illustrated, a driving shaft 1 which may be rotated at high speed by any source of power, is equipped with an annular flange 2 at what may be termed the rear end thereof, which is connected by cap screws to a circular plate 3, the diameter of which is appreciably greater than that of the flange 2. From the rear side of plate 3 a plurality of studs or posts 4 extend horizontally to the rear, each of which at one side has a lateral extension 4a (Fig. 2) for the connection thereto of a circular flange member 5 by means of cap screws threading into the posts 4, and accurately located by dowels 4b extending into the lateral enlargements 4a. From the flange 5, spaced short heavy bars 6 integrally cast therewith, extend rearwardly, spaced from each other and located at equal distances from the axis extension of shaft 1. At the rear end of the bars 6, a cylindrical sleeve 7 extends, having an axis coincident with an extension of the axis of the driving shaft 1, and connected at the rear end of which is an annular ring 8 supplied with retainers 9 of sheet metal which make an annular channel within which packing material may be located.

At the forward end of the sleeve 7 and near its juncture with the bars 6, an annular flange or equivalent ears 9 extend outward, between which and the front plate 3, a sheet metal enclosing housing 10 is located, secured in place by screws as shown. It is apparent that upon rotation of the drive shaft 1, all of the structural parts which have been described, being permanently and inseparably connected turn therewith at the same speed.

Back of the flange 2 and preferably integral therewith and with the drive shaft 1, a stud shaft 11 is located having its axis as a continuation of the axis of the shaft 1, and it passes through the center portion of the front plate 3. A sleeve or hub 12 is mounted for rotative or rocking movement on the reduced diameter, inner or rear end portion of the stud shaft 11, with anti-friction bearings between the hub and shaft. Said sleeve 12 at its inner or rear end is enlarged and formed with a beveled pinion 13 centrally bored to receive a securing plate or disk 14, which is screw connected to and held at the free end of the stud shaft 11, as shown in Fig. 1.

A plurality of arms 15, shown as three in number, are integrally formed with the sleeve or hub 12 and extend radially outward therefrom, being equally spaced from each other. A weight 16 of cylindrical form and longitudinally slotted from one end to the other diametrically from one side toward, but short of the other side, is pivotally connected at the outer end of each arm 15 by a pivot 17 as shown. Each of the cylindrical weights 16 is slidably mounted in a sleeve 18 open at both ends and shorter in length than the weight 16, and likewise longitudinally slotted at one side for the passage of the associated arm 15. Said sleeves 18 are provided with oppositely extending trunnions 19, which are pivotally or rockably mounted in suitable anti-friction bearings at the inner side of the front plate 3 and the front side of the flange 5. The horizontal axes of the trunnions 19 are disposed inwardly from the axes of their associated pins 17.

A block 20 is located lengthwise between the inner sides of the lugs 6. At one end it has a beveled gear 21 which meshes with the pinion 13, and at the opposite end a blank 22, see Fig. 4, which is for the purpose of balancing to a large degree the weight of the pinion 21. The block is mounted for rocking movement upon two alined studs 23, which extend through the lugs 6 and into the opposite ends of the block 20. The center of the block lies in the extension of the longitudinal axis of shafts 1 and 11.

A cylindrical bearing sleeve 24 is located within the sleeve 7, having a tight or press fit therein. Within the sleeve 24 is a cooperating cylindrical sleeve 25, having a press or shrink fit upon a head 26, which has a reduced diameter portion passing through the ring 8 and through the packing retainers 9, from which a driven shaft 27 extends rearwardly in axial alinement with the shafts 1 and 11. At its inner end portion the cylindrical head 26 is diametrically slotted to provide a relatively wide slot 28 (Fig. 5), the bottom 29 of which is the arc of a circle having its center at the center of the previously described block 20.

Within the space provided by the slot 28, a block 30 is movably mounted with opposite parallel sides in free sliding engagement with the sides of the slot 28, and an inner end of curved form with the same radius of curvature as the bottom 29 of the slot and riding thereagainst. The block 30 at its under side is formed with a longitudinal, relatively deep slot 31, and at the front end of said slot, integrally connected with the block are two spaced fingers 32 of the form best shown in Fig. 1 which, together with the front or outer end portion of the block at said slot 31, provide inverted U-shaped guides as shown. The block 30 is movable from its extreme upper position, as shown in Fig. 1 in the slot, to an extreme lower position in which the under side of the block 30 comes against the lower side of the sleeve 25.

The block 30 has an opening through it from front to rear, with anti-friction bearings therein, and in which the cylindrical end portion or stem 33 at the rear end of a fork 34 is received for free rotative movement. The sides of the fork 34 extend in a forward direction, one at each side of the block 20 and between the gear 21 and the balancing blank 22. A rod or shaft 35 extends through the block 20, the axis of which is at right angles to the pivotal studs 23 (Fig. 4) and is mounted in anti-friction bearings in openings in the sides of the fork 34.

A sleeve 36 is mounted upon the shaft 27, back of the housed apparatus described, and is provided with a downwardly projecting lug 36a. A rod 37 is secured to said lug and extends forward slidably through the head 26 and into the slot 28. At its forward end it is provided with a crosshead 38 located in the U-shaped guides back of the fingers 32. A ring 39 of channel cross section is rotatably mounted upon and disposed around the sleeve 36 with ball bearings between the sleeve and ring, which retain the ring in place.

It is evident that through the connection of suitable manually operable means controlled by the operator, such as a pedal, hand lever or the like, connected with the ring 39, sleeve 36 may be moved longitudinally of the shaft 27. Such movement through the rod 37 and its head 38 will move the block 30 to any desired angular position between its two extremes of movement within the slot 30. In the extreme position of the block 30 shown in Fig. 1, the axis of the part 33 is at the greatest angle to the common axis of the shafts 1, 11 and 27. As the block is moved from the extreme position shown to the other side of the head 26, such angle progressively decreases until, when the block 30 is stopped by coming against the opposite side of the sleeve 25, the axis of the part 30 coincides with the common axis of the shafts 1 and 27. In the latter position, whatever the speed of rotation of the shaft 1 may be, the cylindrical projection 33 from the fork will merely turn freely within its surrounding bearings and shaft 27 remain at rest.

Figure 3:
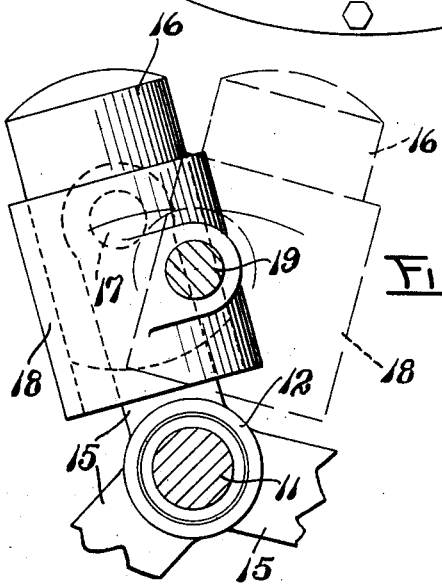
Fig. 3 is a fragmentary vertical section illustrative of different positions of the centrifugal weights and guide sleeves therefor which are at neutral position in Fig. 2 and indicated at the two extremes from the neutral position.

When the annular relation of the axis of the stem 33 is changed from direct alinement and coincidence with the common axis of the driving and driven shafts, the driving of the driven shaft from the driving shaft will take place with a progressive increase from zero speed of rotation of the driven shaft 27 through all gradations of speed until its speed is at a 1 to 1 ratio with the driving shaft, this occurring when the angle of the axis of the stem 33 is at its greatest with respect to the longitudinal axes of the driving and driven shafts, or when the parts are positioned as in Fig. 1. In this operation the block 20 is the central block of a universal joint with two axes, one through the rod 35 and the other through the studs 23, at right angles to each other. The centrifugal weights 16, and the sleeves 18 in which they are slidably mounted, will assume varying positions governed by the rotative speed of the driving shaft 1, the load on the shaft 27 and the mass of said weights, turning about the axis of the trunnions 19 from the neutral position shown in Fig. 2, in which the axes of the weights 16 are substantially tangent to a circle, the center of which is in the axis of the driving shaft, to either of the extreme positions shown in Fig. 3, wherein the weights have their axes extending radially outward from the axis of the shafts 1 and 11.

In the operation, when the torque arm, which is the fork 34 and the shaft projection 33, is at an angle to the common axis of the driving and driven shafts, the mechanism shown, except the driven shaft 27 and the head 26 integral therewith, is rotating at the same speed as the drive shaft 1. Such head, at rest, serves as an abutment for the torque arm and member 20 is rocked backward back and forth about the axis of the studs 23. Such rocking movement is imparted, through the meshed gears 21 and 13, to the sleeve or hub 12. Of course the degree of rocking movement will increase with the increase of angular relation of the torque arm axis with respect to the longitudinal axis of the drive shaft.

In such rocking movement, the arms 15 are rocked back and forth and the sleeves 18 tilted about the axes of their trunnions 19 in accordance with the movements, thus the weights 16 are changed in position with the rocking movements of the sleeves 18. The change in position of the weights 16 with respect to the arms 15 upon which they are pivoted will increase in direct proportion to the increase of the angle of the torque arm axis to the axis of the drive shaft 1.

Such change of position of the weights 16 and the centrifugal force thereof as they rotate rapidly about the axis of the drive shaft, generates a resistance against rocking the member 20 which manifests itself by lateral pressure of the fork stem 34 against the head 26, tending to turn the shaft 27 about its axis. When such centrifugal force is sufficient to overcome the inertia and other load of the driven shaft 27, the shaft will begin to rotate and progressively increase in its rotation until it is at its maximum speed with respect to the speed of rotation of the drive shaft.

The construction described has been built and fully tested and tried, and has proved exceptionally satisfactory in operation. It is a structure of relatively simple, economical form, easily manufactured and assembled, and may be used in the place of a clutch connection between driving and driven members and serves to drive the driven member from the driving member at innumerable numbers of ratios of speed ranging between no speed for the driven member to a complete one to one direct driving rate, between said driving and driven members or shafts, and may be controlled for selection of any of said intermediate driving ratios between the driving and driven members or shafts.

The invention is defined in the appended claims and is to be considered comprehensive of all forms of structures coming within their scope.

I claim:

1. In a structure as described, a rotatable driving member and a rotatable driven member having a common axis of rotation, a sleeve rockably mounted on said driving member to turn on the axis thereof, arms extending from the sleeve, elongated weights pivotally connected at the outer ends of said arms, guides for the weights, means driven by the driving member upon which said guides are rockably mounted for changing position of the weights and turning them outwardly upon rocking movements of said sleeve, a block having gear connections with said sleeve, means for mounting said block to turn about an axis at right angles to the axis of turning of said drive member and for mounting said block to move with the drive member about its axis of rotation, an arm pivotally connected at one end to said block to turn about an axis at right angles to the axis of rocking of the block and at right angles to the axis of turning movement of the drive member, said arm extending toward the driven member, means mounted upon the driven member rotatably receiving said arm, and means for moving said means into positions at one of which said arm is in axial alinement with the axis of rotation of the drive and driven members, or in which it is at an acute angle thereto.

2. A construction as defined in claim 1, said driven member having a head with an arcuate slot therein, said means receiving the arm being located in said slot and movable from one side to the other thereof, and means connected therewith for moving said means in said slot selectively to said positions.

3. In a structure of the class described, a drive shaft, a plate secured thereto at right angles to the shaft and through which the shaft extends, a second plate paralleling the first plate and spaced therefrom, means connecting said second plate to said first plate, a sleeve rockingly mounted on the drive shaft between said plates, a plurality of radial arms extending from the sleeve, elongated cylindrical weights pivotally connected between their ends, one to the end of each arm, guide cylinders in which said weights are slidably mounted, means for rockably mounting said guide cylinders on said plates on axes paralleling the axis of rotation of the drive shaft and located inwardly of the pivotal axis of said weights, spaced lugs extending from the second plate, journal pins at right angles to the axis of the drive shaft extending through said lugs, a block located between the lugs into which said journal pins extend, said block having free rocking movement thereon, gearing connections between one end of said block and said sleeve, a fork pivotally connected to the block to turn on an axis at right angles to the axis of rotation of the drive shaft, and at right angles to the axis of rocking movement of the block on said journal pins, said fork having a cylindrical free end portion, a member having a bearing therein in which said cylindrical end portion of the fork is rotatably received, a driven shaft, a head having an arcuate slot at its inner side in which said last mentioned member is received, said member being movable from one end to the other of said slot, a bearing housing extending from said lugs around said head in which the head is rotatably mounted, and means to move said member within the slot of said head into positions, in one of which the axes of the drive and driven shafts and of the cylindrical extension to said fork are in alinement, and in another of which the axis of said extension to the fork is located at an acute angle to the axis of the drive and driven shafts.

4. A structure as defined in claim 3, said member in the arcuate slot of said head being longitudinally slotted parallel to the axis of the cylindrical extension to the fork, and said member at the inner end thereof at each side of the slot having a hook member, between each of which and the adjacent end of said member is a U-shaped recess, a rod paralleling the driven shaft slidably mounted through said head and received in the slot of said member mounted on the head, the inner end of said rod having lateral projections extending into said U-shaped recesses, and means for moving said rod in the direction of its length, as specified.

5. In a structure as described, drive and driven shafts in alinement with each other, having a common axis of rotation, a torque arm connected with the driven shaft at one end portion thereof, means with which the torque arm is rotatably connected movably mounted on said driven shaft, said means being movable to position the torque arm with its axis coincident with that of the driving and driven shafts or at an acute angle thereto, manually operable means for moving said movable means to either of said positions, centrifugal weights mounted on the drive shaft outwardly thereof, means for carrying said weights in a circular path around the axis of the drive shaft upon its rotation, means for mounting said weights for shifting them in position and for rocking them back and forth about the axis of the drive shaft, and means connected with said torque arm for rocking said weights and shifting them when said torque arm is in said inclined position.

6. In a structure as described, a rotatable driving and a driven means located in axial alinement, a centrifugal power means rotatably mounted upon the driving means to rock about the axis of rotation thereof and connected to rotate bodily in unison therewith, and adjustable means between said centrifugal power means and the driven means, adjustable into axial alinement with said driving and driven means, or to a position out of such alinement and connected with the driving means to move bodily therewith, for rocking said centrifugal power means about the axis of rotation of said driving means and for rotating said driven means when adjusted to the second of said positions, and turning freely with the driven means at rest when in alinement therewith.

7. In a structure of the class described, rotatable driving and driven members separated from each other and located in axial alinement, a centrifugal power means mounted for rocking movement on said driving member to rock about the rotative axis of said driving member, means connecting said centrifugal power means with the driving member to move bodily therewith in its rotation, intervening means between the centrifugal power means and the driven member connected with both thereof for rocking said centrifugal power means during its rotation with the driving member, said intervening means being adjustable into axial alinement with said driving and driven members, wherein said driving member may be continuously rotated and the driven member remain at rest, and said intervening means being adjustable into an angular position relative to the axis of rotation of said driving and driven members, in which position the driving member will drive said driven member in all variations of speed between a direct one to one ratio of the driving to the driven members, and a zero speed of said driven member, with a progressive decrease of speed of the driven member or progressive increase thereof in conformity with the speed of rotation of said driving member.

8. In a structure of the class described, rotatable driving and driven members in axial alinement spaced from each other at adjacent ends, a centrifugal power apparatus connected with the driving member to turn bodily therewith about the rotative axis of the driving member, and also mounted thereon for back and forth rocking movement about said axis, means included in the centrifugal power apparatus for varying the centrifugal force thereof in accordance with the extent of such rocking movement, means connecting said centrifugal power apparatus with the driven member, means actuated by said connecting means for rocking said centrifugal power apparatus, said connecting means being adjustable with respect to the driven member between two extreme positions, in one of which its axis of rotation is in alinement with that of the driving and driven members and the centrigual power apparatus is not rocked, and in the other of which it is out of alinement with said driving and driven members and the rocking of the centrifugal power apparatus is in proportion to the extent of such misalinement, said connecting means including a pivotally mounted torque arm rotatably connected with the driven member at one end portion and having its other end connected with the driving shaft so as to be held at its axis of rotation, the force of said centrifugal power apparatus being transmitted through said torque arm to the driven member to drive it when out of alinement therewith, and to turn freely with respect thereto when in alinement.

9. A construction as defined in claim 8, and means connected with said torque arm for moving it to either of said positions, one in alinement with the driving and driven members and the other at an acute angle thereto.

10. In a structure as described, a drive shaft, a driven shaft in alignment therewith, centrifugal mechanism between said driving and driven shafts connected and turning with the drive shaft, means associated with said centrifugal mechanism located between the drive and driven shafts including, a torque arm adjustably connected with the driven shaft and adapted to be moved into alignment therewith or to a plurality of positions at acute angles to the length thereof, means connecting said torque arm with said centrifugal mechanism operating said centrifugal mechanism to different positions in accordance with the position of the torque arm relative to the driven shaft, thereby applying force to the driven shaft when the torque arm is at an acute angle to the rotative axis of the drive and driven shafts, and rendering the centrifugal mechanism inoperative and ineffective when the torque arm is aligned with the drive and driven shafts.

BERTRAND F. KENYON.

REFERENCES CITED

The following references are of record in the file of this patent:

UNITED STATES PATENTS

| Number | Name | Date |
|---|---|---|
| 1,522,839 | Rogers | Jan. 13, 1925 |
| 1,645,841 | Whitlow | Oct. 18, 1927 |
| 1,736,789 | Janssen | Nov. 26, 1929 |
| 1,966,357 | Palmer | July 10, 1934 |
| 2,026,999 | Schumaker | Jan. 7, 1936 |